3,320,328
PERMSELECTIVE MEMBRANES
Alan S. Michaels, Lexington, Mass., assignor to Amicon Corporation, Cambridge, Mass., a corporation of Massachusetts
No Drawing. Filed June 14, 1963, Ser. No. 287,788
2 Claims. (Cl. 260—674)

This invention relates to diffusion processes for separating a mixture of compounds into fractions relatively enriched and depleted with respect to one or more of the compounds, and in particular to permselective membranes for use in such processes.

Films suitable for diffusional separation processes may be formed of any of the well-known film forming natural or synthetic polymeric materials capable of being sheeted out and having substantial mechanical strength. Preferred materials for this invention are the high density polyolefins e.g., polyethylene (0.94–0.97 g./cc.) capable of being drawn linearly. The films should have a thickness no greater than about 0.05 inch and preferably between 0.0005 and 0.010 inch, and must be formed of a polymeric material in which the ingredients of the mixture will dissolve or be absorbed to the extent of between about 1% and 30% by weight of the dry membrane at the temperature at which the diffusion separation is to be carried out. The extent to which any given fluid compound, or mixture of fluid compounds, is dissolved or absorbed by any particular polymeric material is generally well known, but in any case may be determined by well-known simple test procedures with which those skilled in the art are familiar.

According to the process described in the pending application of Michaels and Baddour, Ser. No. 93,842, filed Mar. 7, 1961, the membrane of polymeric material, such as high density or low density polyethylene, which has been chosen for a given separation is subjected to swelling or solvation by one selected compound of the mixture of compounds to be separated. The selection of the compound to be employed for this purpose is determined by consideration of the molecular cross sectional areas of the components of the mixture; where it is desired to separate from the mixture the compound possessing the smallest molecular cross sectional area, then that compound should be employed for treatment of the membrane. Alternatively the membrane may be treated with any other substance which has a cohesive energy density (latent heat evaporization of liquid material per cubic centimeter of liquid) within 20% of that of the selected ingredient and a molecular cross sectional area equal to or less than that of the selected ingredient.

The treatment of the polymeric membrane by the selected compound or substitute material is carried out at a temperature at least 5° C. higher than the temperature at which the ultimate diffusion separation is to be carried out but lower than the temperature at which the polymeric material dissolves in that particular compound to such an extent that the membrane loses its integrity. In general this step is carried out at temperature at which the membrane absorbs from about 1% to 50% by weight of the selected compound or substitute material, preferably from 5% to 15% by weight. The treatment is carried out sufficiently long to insure that equilibration between the two has occurred.

The foregoing description is given to summarize briefly the manner in which membranes and polymeric materials may be treated to improve their efficacy for diffusion separation processes as described in the pending application, Ser. No. 93,842. Reference to that application is made for a detailed description.

The present invention is based on the discovery that further improvement in the characteristics of the membrane for diffusion and separation processes may be brought about by stretching the membrane prior to the treatment with the selected compound, the latter treatment being carried out with or without the membrane being mechanically constrained from elastic recovery. Conveniently the improvement represented by this invention is brought about by uniaxially pulling the membrane to elongate it substantially, typically in excess of 100% of its original dimension. After it has been stretched, and with or without its being held in a stretched condition, the membrane is immersed in the selected compound, at a temperature more than 10° C. below its melting or dissolution temperature, until the desired amount of the compound has been absorbed, all as described in the above identified pending application. Following treatment with the selected compound the membrane is allowed to dry with or without constraint, typically at room temperature, and is then mounted in suitable conventional diffusion separation equipment.

In a typical example polymeric films of polyethylenemaleate [1] having an initial thickness of about 4 mils was stretched to about 520% of its original length, following which 4 inch squares were immersed each in 50 milliliters of liquid para-xylene or ortho-xylene and held there at temperatures of 40° C., 60° C. and 80° C. for 24 hours. Some of the squares were held restrained in a frame and others were unrestrained during the treatment. Following the immersion, the films in their restrained or unrestrained condition, as the case was, were air dried and then mounted in a conventional diffusion cell. It was found that the stretched membrane could be relatively improved in its permeability to the xylene isomer with which it was treated, i.e., o-xylene or p-xylene, with respect to both an unstretched film and an unconditioned film. The following table sets forth a comparison of the permeabilities and selectivities of the various samples at 25° C. as well as samples of unconditioned and conditioned but unstretched membranes, the latter being representative of membranes treated in accordance with the process described in the above-identified application.

TABLE I.—MEMBRANES CONDITIONED WITH ORTHO-XYLENE

| Treatment | Cond. Temp., °C. | Permeabilities, J (gm./cm.²/hr.)×10³ | | Selectivity Ratio, Jp/Jo |
|---|---|---|---|---|
| | | To Ortho | To Para | |
| Control | | 2.42 | 4.05 | 1.67 |
| Unstretched: | | | | |
| Unrestrained | 80 | 7.05 | 15.0 | 2.13 |
| | 60 | 3.52 | 8.55 | 2.51 |
| | 40 | 2.96 | 6.55 | 2.21 |
| Restrained | 80 | 7.93 | 11.4 | 1.44 |
| Stretched: | | | | |
| Unconditioned | | 0.29 | 0.47 | 1.63 |
| Unrestrained | 80 | 19.2 | 17.7 | 0.92 |
| | 60 | 1.49 | 3.51 | 2.36 |
| | 40 | 0.58 | 1.47 | 2.54 |
| Restrained | 80 | 5.92 | 7.10 | 1.20 |
| | 60 | 0.90 | 1.39 | 1.54 |
| | 40 | 0.48 | 1.23 | 2.69 |

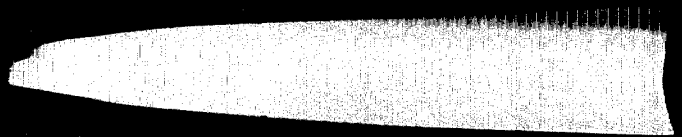

[1] A high density graft copolymer of polyethylene containing 4–5% by weight of dibutyl maleate, drawable at room temperature.